Dec. 31, 1957   C. M. NEHER   2,818,447
HYDROCHLORINATION PROCESS
Filed Dec. 11, 1953
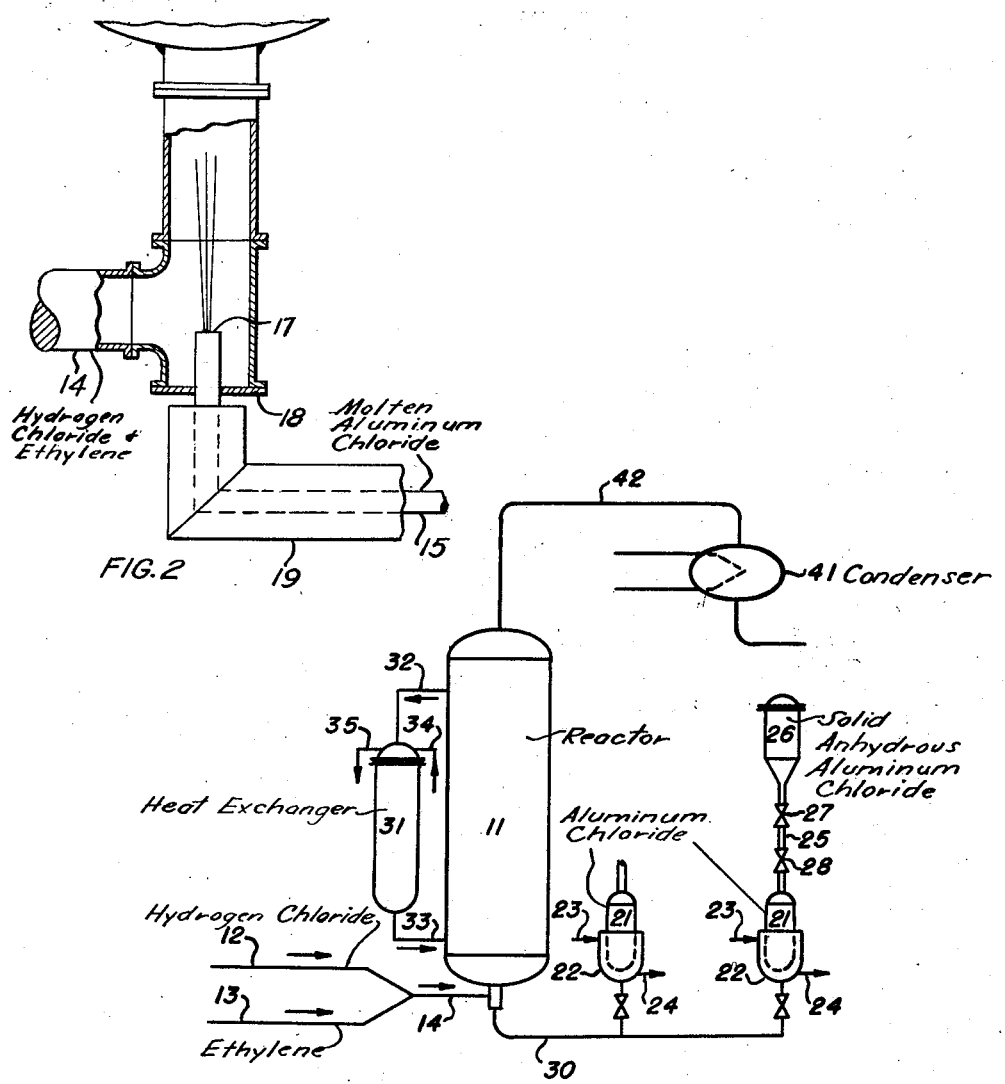
INVENTOR.
CLARENCE M. NEHER
BY Kenneth Swartwood
ATTORNEY

United States Patent Office 2,818,447
Patented Dec. 31, 1957

2,818,447
HYDROCHLORINATION PROCESS

Clarence M. Neher, Baton Rouge, La., assignor to Ethyl Corporation, New York, N. Y., a corporation of Delaware Application December 11, 1953, Serial No. 397,589

1 Claim. (Cl. 260—663)

This invention relates to the hydrochlorination of olefinic hydrocarbons. More specifically, the invention relates to an improved method of providing aluminum chloride catalysts to such a hydrochlorination process characterized by the addition of the hydrogen chloride to the olefin in the presence of a reactor solution comprising the alkyl chloride product of the reaction.

The preparation of ethyl chloride by the addition of hydrogen chloride to ethylene, under the influence of aluminum chloride catalyst, has long been practiced on a commercial scale. Various techniques have been evolved for this process. The most successful process involves feeding anhydrous hydrogen chloride gas and an ethylene containing gaseous stream to a reactor having a substantial quantity of a liquid catalyst solution or reaction medium therein. This reaction medium comprises principally ethyl chloride having dissolved therein a small amount of anhydrous aluminum chloride. The two feed gases are usually mixed prior to the point of introduction and jointly bubble up through this reaction solution and form more ethyl chloride. A continuous stream of the reactor solution is removed from the reactor and circulated through heat exchangers for cooling and thus removal of the heated reaction. Ordinarily, the product is discharged from the reactor in the vapor phase i. e., by boiling off as an overhead stream from the reactor.

Despite the very lengthy commercial experience with the above described type of reaction, the utilization of the feed materials leaves much to be desired. Several reasons are apparent for this deficiency. It has been a past commercial practice to add solid anhydrous aluminum chloride on a cyclic basis to maintain the desired catalytic activity of the solution. However, it has been found that the concentration of aluminum chloride in the solution is a particularly potent factor in altering the course of chemical reaction within the reactor. Thus, although the aluminum chloride is primarily intended to catalyze the desired hydrochlorination, it can also cause rapid polymerization of the olefinic feed materials to a polymeric resinous oil or gum. This polymer contains as an entrapped material, appreciable quantities of the aluminum chloride values present. This tendency to cause polymerization reactions is accentuated very markedly when the aluminum chloride concentration is above the necessary level at which it promotes the desired hydrochlorination. Hence, the technique of cyclically adding the aluminum chloride heretofore practiced always resulted in frequent periods of a high rate of polymer formation.

An additional difficulty encountered in the commercial operations was the fact that the precise stoichiometric ratio of the hydrogen chloride to ethylene was very difficult to maintain within narrow limits. This was particularly true in those instances wherein the ethylene feed stream was accompanied by appreciable quantities of low molecular weight alkane diluents, such as methane and ethane. Thus, even if the hydrogen chloride:ethylene ratio was carefully set at equal molar proportions at a given time, a minor variation in the concentration of the ethylene feed stream would be responsible for appreciable alteration. Therefore, it frequently was observed that ethylene was actually being fed in more than stoichiometric proportions to the hydrogen component. The presence of this excess ethylene also attributed to polymer formation.

As indicated above, it has been realized for some time that commercial operations do not even approach the potentialities of which the reaction is capable. In a commercial operation which is generally considered to represent efficient industrial practice, for example, the rate of consumption of aluminum chloride has been in the range of 1.5 to 2.5 pounds of aluminum chloride per 100 pounds of ethyl chloride produced. This consumption occurs when the aluminum chloride content of the reactor solution is above 1 weight percent. At this concentration level, relatively rapid deactivation occurs, however, therefore giving rise to the high consumption rate. In contrast to the above utilizations of catalyst, it has been found in carefully controlled operations that, by maintaining catalyst concentration in the range of 0.1 to not over about 1 percent by weight in the liquid reactor solution, catalyst consumption is appreciably reduced. The preferred range of catalyst concentration is from 0.2 to 0.3 weight percent, and in such instances, the consumption will be less than 0.8 part per 100 parts of ethyl chloride and frequently as low as 0.5 part.

It has been proposed to eliminate the difficulties described above by feeding the aluminum chloride in a continuous manner so that it would be effective with respect to the hydrochlorination reaction but more or less ineffective with respect to the undesired by-product polymerization reaction. Success in this regard would result in reduction of the catalyst aluminum chloride consumption and also in more efficient ethylene and hydrogen chloride utilization. Attempts to accomplish this by introducing solid anhydrous aluminum chloride to the system have not been particularly successful. The aluminum chloride, being very deliquescent can only with difficulty be introduced into an enclosed, pressurized reaction vessel without frequent interruption. A solids conveying system for operation on a continuous basis would necessarily involve some type of a screw conveyor to feed this material and experience has shown that its service factor is very low.

Accordingly, an object of the present invention is to provide an improved process wherein the aluminum chloride catalyst is maintained only at the necessary concentration to effect the desired reaction while avoiding undesired side reactions. Another object of the process is to provide a method of continuously introducing the aluminum chloride at a rate corresponding to the minimum or moderate rate of consumption while maintaining a high conversion of the olefin and hydrogen chloride feed. A further object is to distribute the aluminum chloride required for the process uniformly within the reaction system, so that localized high concentration regions are avoided. An additional object is to generally improve the efficiency of an ethylene hydrochlorination process.

Generally, the process involves the continuous introduction of aluminum chloride vapor to either or both of the gaseous feed streams immediately prior to their entry into the hydrochlorination reactor. Alternatively, the aluminum chloride may be fed to the liquid converter solution, preferably at a point where relatively rapid circulation of the liquid converted solution is being provided. In either instance, the feed of the aluminum chloride is accomplished by maintaining a supply of pure anhydrous fresh aluminum chloride in a separate vessel and under a temperature which is above its triple point, 192.6° C., so that it is maintained in the liquid phase and develops an appreciable pressure. The pressure maintained in this manner in preferably at such lever that it is sufficiently above the operating pressure of the feed streams (or of the reactor) that it can be injected into the system under its own pressure. Employment of this technique eliminates entirely the necessity of complex mechanical arrangements for continuously introducing this material. Alternatively, however, provision can be made for externally establishing the desired pressure on the liquefied aluminum chloride, as, for example, by establishing an inert gas pressure over the liquid aluminum chloride, or by pumping this material.

The manner of carrying out the process in the best way and the details of operation will be apparent from the following working example in conjunction with the accompanying figures wherein Figure 1 is a schematic representation of a plant unit for introducing the aluminum chloride to the gaseous feeds, and Figure 2 is a partially sectioned view of specific feed apparatus arrangement for introducing the aluminum chloride into the gaseous feed streams.

Referring to Figure 1 a schematic layout of apparatus for preparing ethyl chloride or similar alkyl chlorides utilizing the present process, wherein the aluminum chloride is fed to the gaseous feeds. Principal features of the apparatus are a reactor 11, a cooling heat exchanger 31, and aluminum chloride supply drums 21. A condenser 41 provides for liquefaction of ethyl chloride and other condensable components from the overhead gases from the reactor 11, which is transmitted by the overhead line 42. The heat exchanger 31 provides for removing the heat of the reaction from the system, liquid reaction medium being circulated to the exchanger 31 by an overflow line 32 and back to the reactor 11 by a return line 33. A cooling heat exchange medium is circulated by conventional lines 34, 35. The hydrogen chloride and ethylene containing feed streams for the process are fed through separate feed lines 12, 13. These feed lines are manifolded in a feed nozzle 14. Aluminum chloride catalyst is introduced to the manifold 14 through a heated jet 15 described more explicitly hereafter. Briefly, the jet 15 provides a thin stream of aluminum chloride liquid fed through a sharp edged metal orifice, the stream being centered in the manifold channel and the flow being with the flow of the mixed feed gases. Feeding the aluminum chloride in this manner assures that no catalyst will be deposited on the walls of the feed manifold 14. Although the aluminum chloride is fed in the liquid phase the conditions in the manifold are such that immediate sublimation occurs owing to the heat content or enthalpy of the liquid aluminum chloride stream, plus the pressure differential encountered.

The aluminium chloride supply vessels 21 are in duplicate permitting intermittent operation with each as a source of feed aluminum chloride. Each vessel is provided with a jacket 22 for a heat exchange medium to provide the desired temperature within the supply vessels 21. Lines 23 and 24 provide for circulation of this heat exchange material to the jackets 22. The aluminum chloride supply vessels are charged with solid anhydrous aluminum chloride through a standpipe 25 which in turn is fed by hopper 26. A pair of block valves 27 provide for gravity feed of this material at the start of an operating cycle. In operation, after charging a supply tank 21 the block 28 is closed and the vessel 21 is heated by a suitable heating medium in the jacket 22 to a temperature such that the aluminum chloride is converted to the liquid phase. Liquid aluminium chloride is forced under its own pressure through a feed line 30 past a valve 29 to the aluminum chloride jet nozzle above mentioned.

The mixed feeds to the reactor 11, thus include hydrogen chloride and ethylene in equimolal, or approximately equal molal, proportions plus the requisite amount of aluminum chloride to maintain catalyst solution within the converter 11 at the required stage of catalytic activity, but avoiding all peaks and valleys in the concentration.

As a working example of the invention applied to the commercial manufacture of ethyl chloride, a reactor 11 is filled with approximately 10,000 parts of ethyl chloride. A hydrogen chloride stream and an ethylene stream are fed through lines 12 and 13 and joined and mixed together in line 14. The pressure and temperature of operation of the reactor are maintained at about 125 pounds per square inch and 50° C. The hydrogen chloride feed stream contains approximately 94 volume percent hydrogen chloride, the balance being largely inert components such as nitrogen gas. The ethylene feed stream contains approximately 65 volume percent ethylene, 30 volume percent ethane and methane, and 5 volume percent hydrogen and other materials inert to the reaction. The aluminum chloride feed is at the rate of about 0.6 pound per hundred pounds of hydrogen chloride, the aluminum chloride in the supply vessels being maintained at a temperature of about 280° C. to develop the required pressure.

In operation of the unit the utilization of hydrogen chloride and ethylene is appreciably higher than heretofore encountered and the rate of polymer formation and deactivation of the aluminum chloride is appreciably less than past experience has shown.

In the foregoing examples, the procedure of feeding the liquid aluminum chloride concentrically in, and in the same direction of flow as the mixed feed gas streams provides specific advantages. By providing this central jet as a liquid stream and at a sufficiently high temperature, that it immediately vaporizes, the necessity of providing mechanical apparatus to avoid condensation on the walls of the feed manifold is avoided. In addition, however, it has been found highly beneficial to heat the manifold right up to the point of entry to the reactor.

As already indicated, the nozzle for the aluminum chloride illustrated by Figure 2 provides for obtaining the special benefits of the foregoing embodiment. Referring to Figure 2, a molten aluminum chloride feed line 15 passes through a cap 18 near the end of the manifold line 14. The feed line 15 is maintained at a temperature of the order of 200° C. by steam under pressure in the jacket line or jacket 19, or by some other suitable heat transfer medium. The end of the feed line 15 is closed by a sharp edge orifice 17 so mounted that the aluminum chloride liquid is forced through at a relatively high velocity in the substantial center of the manifold 14. Concurrently, hydrogen chloride and ethylene are fed to the manifold through the nozzles from lines 12 and 13. The manifold line is also maintained at the desired elevated temperature of the order of 200° C. by a heat transfer medium in the jacket 20.

It will be seen from the foregoing description of the apparatus of Figure 2, that at no point is the aluminum chloride in contact with a surface which allows its temperature to drop below the triple point. In addition, at all points preceding the orifice 17 the pressure maintained on this system is such that the liquid phase is maintained. In a typical operation, the diameter of the sharp edge orifice 17 is approximately one-eighth inch and the manifold line 14 is six inches in diameter.

Although the preferred embodiment of the invention is carried out as in the foregoing examples, it is not limited to that embodiment. Thus, it is not absolutely essential that the aluminum chloride jet be introduced in a direction parallel to the flow of mixed feed gases. In some instances, it may be preferred to allow the aluminum chloride to impinge on the wall of the conduit conveying the feed gases. In these instances, it is preferred that the feed conduit itself be maintained at a temperature above 192.6° C. The solidification of the aluminum chloride is therefore prevented.

In addition to the above described embodiments wherein the aluminum chloride is fed to one of the gas feed streams, or to a mixed feed stream, the process is fully applicable to continuous feed directly to liquid components of the process. In such cases, however, it is more difficult to avoid localized concentrations of the aluminum chloride than in embodiments wherein it is distributed in or introduced jointly with the gaseous reactants. Accordingly, when the aluminum chloride liquid is introduced to liquid reactor solution, it is preferred to do so at a point where there is relatively rapid circulation of the liquid. A particularly suitable point of feed in this regard is supplied by cooling systems commonly employed. Owing to substantial heat evolution in a hydrochlorination process, continual heat removal from the reaction medium is required. In the installation shown by Figure 1, for example, a heat exchanger 31 is provided. The reaction medium overflows from the reactor 11 through line 32 and is thus fed to the cooler 31, being returned to the reactor 11 by a return line 33. The rate of flow of reaction medium in this system is at a high rate, so that introduction of liquid aluminum chloride into the circulating liquid stream, for example, obtains maximum dissemination of fresh catalyst and avoids localized concentrations.

In addition to the foregoing embodiments of the process, numerous additional variations will be possible within the scope of the appended claim.

I claim:

In a process for manufacture of ethyl chloride comprising feeding together a gaseous ethylene containing stream and a gaseous hydrogen chloride containing stream to form a mixed feed stream at a pressure of over 100 pounds per square inch, and then passing said mixed feed stream into contact with a catalyst solution consisting essentially of liquid ethyl chloride, said ethyl chloride containing aluminum chloride in a concentration of from about 0.2 to about 0.3 weight percent, whereby additional ethyl chloride is formed and the aluminum chloride is deactivated, at a rate corresponding to about 0.5 to about 0.8 part by weight per 100 parts of ethyl chloride formed, the improvement comprising providing a supply of anhydrous liquid aluminum chloride in a confined space at a temperature of about 250° C., thereby generating a vapor pressure appreciably above the pressure of the catalyst solution, forcing a thin stream of the liquid aluminum chloride concentrically into and in the same direction as said mixed feed stream and at a rate corresponding to the rate of deactivation of the aluminum chloride accompanying the ethyl chloride formation, the aluminum chloride stream being introduced solely under the force of its own vapor pressure.

References Cited in the file of this patent

UNITED STATES PATENTS

| | | |
|---|---|---|
| 1,518,182 | Curme | Dec. 9, 1924 |
| 1,637,972 | Suida | Aug. 2, 1927 |
| 2,140,507 | Chamberlain et al. | Dec. 20, 1938 |
| 2,280,207 | Waterman et al. | Apr. 21, 1942 |

FOREIGN PATENTS

| | | |
|---|---|---|
| 119,959 | Austria | Nov. 25, 1930 |
| 780,057 | France | Jan. 24, 1935 |